United States Patent [19]
Magor

[11] 3,795,154
[45] Mar. 5, 1974

[54] CALIBRATABLE CONTROL

[75] Inventor: Lincoln Stoddard Magor, Galt, Ontario, Canada

[73] Assignee: Mimik Limited, Galt, Ontario, Canada

[22] Filed: Sept. 11, 1972

[21] Appl. No.: 287,915

[30] Foreign Application Priority Data
Sept. 13, 1971 Great Britain.................... 42486/71

[52] U.S. Cl..................... 74/422, 74/388 R, 74/425
[51] Int. Cl. ...... F16h 1/04, F16h 1/16, F16h 35/06
[58] Field of Search.................. 74/422, 388 R, 425

[56] References Cited
UNITED STATES PATENTS
| | | | |
|---|---|---|---|
| 2,739,485 | 3/1956 | Sengebusch | 74/422 X |
| 3,176,534 | 4/1965 | Rice et al. | 74/425 |
| 3,377,799 | 4/1968 | Geyer | 74/422 X |

*Primary Examiner*—Leonard H. Gerin

[57] ABSTRACT

A rod for servo mechanism is converted to a rack by moving longitudinally to be cut by the teeth of a harder toothed gear.

5 Claims, 7 Drawing Figures

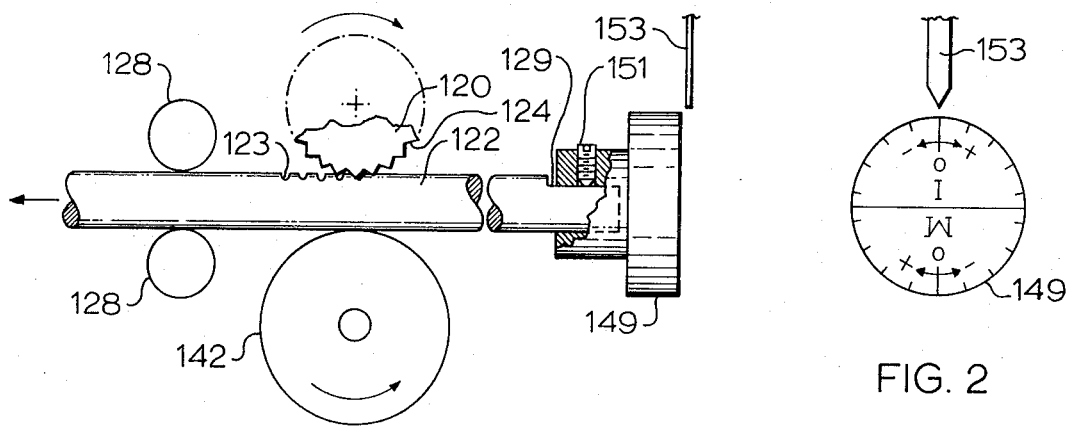
FIG. 1
FIG. 2
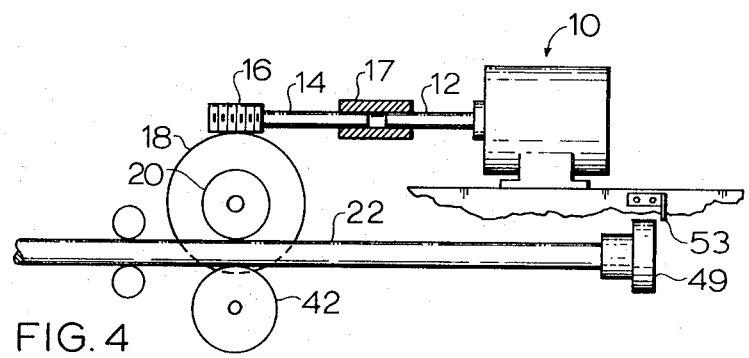
FIG. 4
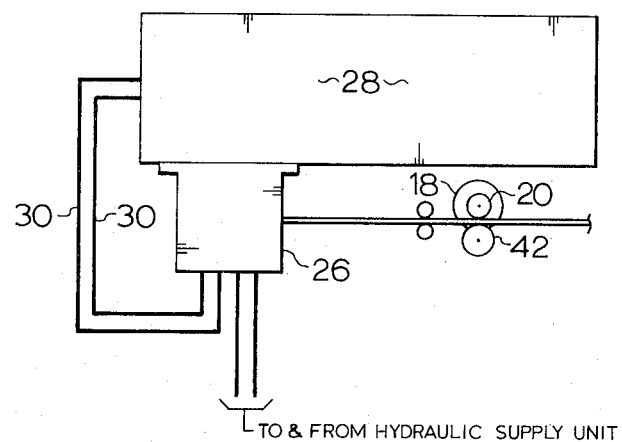
FIG. 5

CALIBRATABLE CONTROL

This invention relates to an element for use in servo mechanisms, to its mode of use.

The invention is utilized in the drive for a servo system. In the drive, a rod whose linear movement is designed to actuate a servo system is provided with indentations causing the rod to act like a gear rack when driven by a toothed gear which (being of greater hardness than the rod) may be used to form its own meshing depressions in the rod. Each series of regularly spaced depressions cut in the rod by the toothed wheel are referred to herein as a gear rack even though, due to the method of cutting the indentations, they will be somewhat differently shaped from analogous portions of an involute rack. The movement of the gear is caused by a power input device (there is here preferred a stepping motor driving a worm gear) which in turn drives the rod through the rack formed therein. The rod in turn, will be connected to drive a servo mechanism which may be hydraulic or electric — wherein the rod movement causes the corresponding movement of one element of a servo unit relative to the other, e.g. a piston relative to a cylinder in a hydraulic system (or a contact relative to a potentiometer) in an electrical system. (Equivalent servos, depending on such relative movement and whether they are hydraulic or electrical, or otherwise well known to those skilled in the art, are alternatives and combined with the inventive features to be described, will be considered within the scope of the invention.) Movement of the piston relative to the cylinder or the contact relative to the potentiometer is of course designed to displace these members from a relative null output signal position, and to cause corresponding hydraulic liquid or electrical current flow to cause movement to the device to be controlled (such as a machine tool table) by the servo mechanism with which the other relatively moving member of the servo device moves. Such movement of course stops when the movement of the controlled device has been sufficiently, relatively moved to return the servo members to the relative position which results in null electric or hydraulic flow.

One facet of the invention is the method of making the indentations in the metal rod for use as a rack in the servo system. In one alternative, the toothed wheel arranged to drive the rod in the servo system, is made of harder material than the metal rod, and the rod is indented by the wheel, in situ, that is, in its position in the servo system. Means are provided for controlling the depth that the teeth embed themselves in the rod since the linear displacement of the rod decreases with increasing depth of that embedment of the teeth into the rod which occurs during the initial cutting action of the teeth in the rod. The correct linear travel of the rod, for incremental wheel movement, is achieved by adjusting the tooth depth downward or upward for initially cutting the indentations in the rod. The rod is made rotatable about its longitudinal axis, which axis is also the direction of its movement in the servo system, and the rod (preferably cylindrical) is designed to provide alternative racks cut therein by a toothed wheel when rotated about its axis. When, in the process of selecting the correct depth for the "bite" of the teeth into the rod, it is necessary to go from a deeper to a shallower depth, then, of course, it is necessary to rotate the rod about its axis to provide a new location for the cutting of the rack.

Instead of being cut by the toothed wheel of the servo mechanism itself, the rack may be pre-cut by a toothed wheel at a remote location. The toothed wheel which cuts the rack for some applications will be identical to the wheel which will operate with the rack in the servo system. In other applications the wheel cutting the rack will differ from the wheel in the servo system by an amount small enough that the consequent interference between the teeth and rack on the servo system, does not contribute an unacceptable error or destroy the rack. An important application includes cutting at least two racks on the rod, one providing incremental movement of the rod in convenient inch units and the other in convenient metric units. It will be noted that while the rod cut on the servo system will be almost always cut with the wheel driving the rod, the rod may be indented at a remote location with the rod driving the cutting wheel as well as vice versa.

It is very important to note that with all aspects of the invention, different initial cutting depths give different incremental rod movements with the same cutting wheel on the one hand and the same drive wheel on the other hand. (Which may both be the same wheel). Thus the cutting wheel may be moved to different depths to arrive at the correct incremental rod movements, without replacement; and graded incremental rod movements, at different orientations of the rod about its axis, may be obtained with different depth settings of the same cutting wheel.

Thus a further facet of the invention, is the adaption of the methods, previously described, to the provision of a servo mechanism easily and conveniently adaptable from the inch to the metric system and vice versa. This is achieved by selecting inch increments and metric increments for the spaced indentations in the rod which are of almost similar spacing, differing in spacing within limits, explained hereafter. The characterization of such spaced increments as inch or metric is of course made having regard to the control input, the gear train and the drive of the toothed wheel of the servo mechanism. The two sets of metric and inch indentations are cut by respective appropriately sized wheels at discrete angular locations on the rod. The wheel on the servo mechanism is selected with teeth dimensioned to provide incremental drive at tooth spacings which are near enough to the inch and metric rack spacings, to provide movement of either rack to a respective extent accurate within the tolerances for the designed inch or metric range of movement; and which are near enough to the inch and metric rack spacings, that the interference caused by the slightly differing teeth and rack spacing is small enough to prevent undue wear or destruction of the rack within normal use periods. It will be appreciated that the inch and metric increments are quite as likely to be selected having regard for the wheel teeth as vice versa.

With the rod having alternative inch and metric indentations with an appropriately dimensioned wheel, as before described, then the servo system may be quickly and conveniently converted from inch to metric output, or vice versa, by merely rotating the rod to substitute one rack for the other in contact with the servo mechanism. It will be noted that the conversion from an inch to a metric drive, or vice versa can be without any modification of the machine tool (or other device driven by the servo), the power drive or the gear drive train for the wheel.

All that is required in addition to the rod, are two index scales on the dimensional setting controls, i.e. one for inch and one for metric settings.

The rack, produced as above described, when installed in the servo drive, provides a servo system with very accurate adjustment and a drive by the gear wheel, of the rod, that is accurate and without backlash. The absence of backlash is a great advantage of the inventive arrangement over a conventional rack and pinion.

With a cylindrical rod, which is the preferred arrangement in accord with the invention, up to eighteen different orientations about the rod axis have been found available on the rod to therefore allow the provision of up to eighteen different sets of indentations on a single rod.

Further advantages of the inventive system shown, are the provision of a low inertia drive as embodied by the rod, requiring low torque on the motor driving the cooperating toothed gear, allowing the use of higher speed motors, and reducing the probability of overload.

It is also noted, that many servo drives are reversible, i.e. the servo can drive its control input under certain conditions, loading to errors and oscillation in the drive. However, the inventive system in (preferably) providing a worm gear to worm wheel drive, avoids any possibility of reverse drive or feedback, and the motor thus encounters only a constant low value, low inertia load.

In drawings which illustrate a preferred embodiment of the invention:

FIG. 1 shows means for cutting the rod indentations;

FIG. 2 is a part of the equipment shown in FIG. 1;

FIGS. 4 and 5 show schematic indications of the operation of the servo system.

Figure 3:
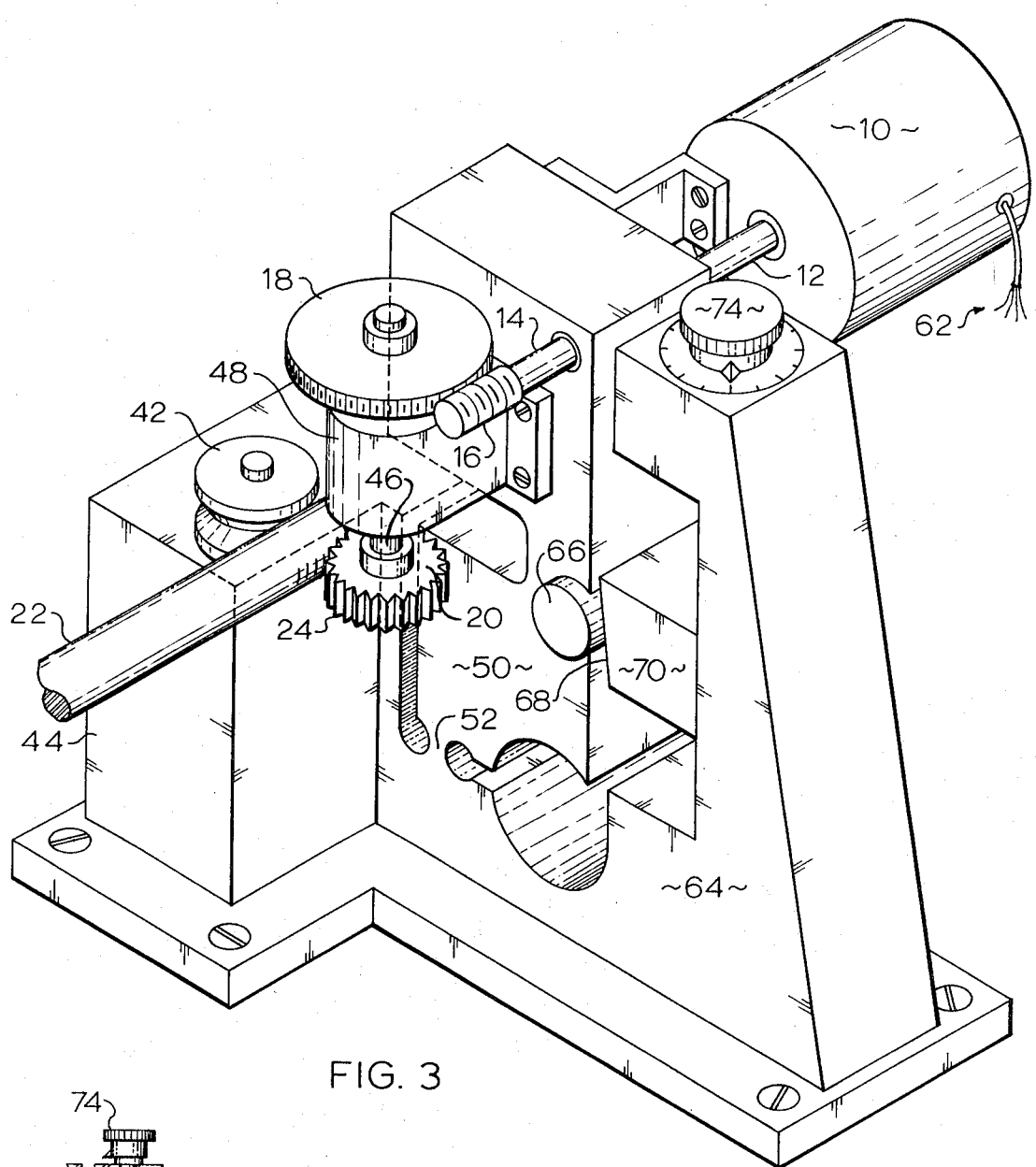
FIG. 3 shows a perspective of a servo drive using a rod in accord with the invention.

In the drawings: FIG. 1 shows schematically, the method for cutting the rod indentations separately from the servo itself.

As shown in the drawings, a cylindrical rod 122 is held between an idler support wheel 142 and the teeth 124 of gear wheel 120. Idler wheel 142 is rotatably mounted on a base support for the mechanism, (not shown). It is understood that the rod will be moved longitudinally by the teeth 124 during the forming of the indentations therein, and hence guide means such as guide rollers 128 will be provided rotatably mounted on a base support for the rod 122 to maintain it in its desired attitude during the cutting of the teeth. It is found that the rod does not rotate about its longitudinal axis relative to the cutting teeth 124 and idler wheel 142 during the cutting of the indentations, hence the rod need only be set to the desired orientation and it will remain there until released from between the teeth and idler. Means (not shown) are provided for controlling the amount of embedment of the teeth into the rod by controlling the clearance between gear wheel 120 and idler 142 and hence the depth of the indentations formed therein. The clearance control means may be designed to withdraw the toothed wheel sufficiently to allow the toothed wheel to be sufficiently withdrawn to release the rod to allow it to be inserted and withdrawn therefrom. The means of controlling the movement of toothed wheel 120 toward and away from the rod, may be designed to operate in accord with any one of a number of well known designs. If desired, the control may also be similar to that shown in FIG. 3 for control of the depth of the self cutting teeth in the servo mechanism. The rod, for indexing purposes, is provided with a small flat surface 129, parallel to the cylindrical rods' axis. A control knob 149 is applied thereto with a setscrew 151 bearing on the flat surface 129. The knob 149 is indexed to provide indications of the available rack orientations on the rod and as shown in FIG. 2, 18 positions (i.e. at discrete 20° intervals) have been found practical. A stationery pointer 153 is provided, mounted on stationery means, not shown, which supplies the datum against which the control knob with the rod may be set.

The drive for the wheel 120 may be achieved in any desired manner including a worm wheel drive of the type indicated in FIG. 3.

The preferred form for the cutting gear teeth is of a saw tooth form with a 90° included angle. Where the teeth are so sloped in the cutting wheel the servo drive will have similar slope. Successful results have also been achieved with cutting and servo teeth (which may be the same teeth) which have their ends truncated.

Using the toothed wheel with 90° included angle teeth, the indentations are cut in the rod providing an outline as indicated in FIG. 1, the correct setting for the depth of embedment of the teeth 124 in rod 122 having been previously determined.

The metric and inch racks each cut to a depth to give the correct increments are preferably located on diametrically opposed sides of the rod. With eighteen available rack positions it is preferred to provide for graded positions on each side of the inch, and on each side of the metric rack. The four racks on one side of a calculated correct rack, are cut to depths to give with each rack progressively increasing increments of rack movement and on the other side progressively decreasing increments. This allows on site calibration of a servo mechanism in the event that for reasons of ambient temperature, power feed, machine tool error or other reason the theoretical inch or metric indentations do not produce the correct output. Exemplary, precise inch and metric dimensions for a rack are discussed after discussion of a servo mechanism involving the invention.

Where the rod is formed on the machine it is necessary that the teeth of the wheel which both cuts and provides the servo drive for the rod must be of harder consistency than the rod. It is preferred that the cutting gear wheel be made of tool steel and the metal rod made of cold rolled steel so that the gear wheel is sufficiently harder that it will bite into the rod to form the depressions which make the rack.

It is very important to note that with all aspects of the invention, different *initial* cutting depths give different incremental rod movements with the same cutting wheel on the one hand, and the same drive wheel on the other hand. (Which may both be the same wheel). Thus the cutting wheel may be moved to different depths to arrive at the correct incremental rod movement without replacement; and graded incremental rod movements, at different orientations of the rod about its axis, may be obtained with different depth settings of the same cutting wheel.

In the drawings, FIGS. 3-5 show the servo drive for the rod. The preferred form for the drive is a pulse input from a source, not shown, and in response to each pulse, rotates shaft 12 through an angle which is substantially the same for each pulse received. Shaft 12 is coupled for rotation therewith to the shaft of worm 16 by a coupling 17. The reduction achieved in the worm 16 to worm wheel 18 and the drive in the drive gear 20 (mounted to rotate wheel 18) to rod 22, allows the use of a pulse motor 10, having high speed and low input torque, which is readily available from a number of sources. One of such motors, which we prefer is manufactured by Fujigsu of Japan.

The worm 16 drives a worm wheel 18 in a manner well known to those skilled in the art. Coaxial with the worm wheel and mounted for rotation therewith is a gear wheel 20. Gear wheel 20 is mounted to drive a rod 22 by a connection, hereafter described in detail, arranged so that rotation of said drive wheel 18 causes translation of rod 22.

As schematically indicated in FIG. 5, the rod 22 is attached to one element of a servo valve 26 (say the piston). The other element of the servo valve (say the piston cylinder) is connected to the element driven by the servo, here the machine table 28. The valve 26 is not shown in detail as it is of well known design. With a preexisting quiescent condition of a stationary rod 22, the piston will be located in the cylinder (in valve 26) in a middle position to prevent any flow from the hydraulic supply unit along lines 30 connecting the servo valve 26 to the piston or hydraulic motor, not shown, controlling the movements of the machine table. In accord with well known design, flow inward to the table motor or cylinder in one line 30, and outward in the other, moves the table in one direction and flow in the opposite directions in the two lines 30 moves the table in the opposite direction. When the rod 22 and attached piston are moved in one direction or the other relative to the cylinder and table, the hydraulic fluid therethrough in a direction to cause the table 28 to move in a direction to cause the cylinder to follow the piston in a direction to cause the flow through the servo valve to stop after the rod 22 has stopped and the servo cylinder and machine table have caught up therewith. The lag during such movement may not affect the machine tool operation during a straight linear operation, but in contouring, the lag, contributes an error, known as 'steady state' or 'following' error, introduces an error into the result even if the cutter or other working tool arrives at the end point right on tolerance. It is found that the arrangement of this invention reduces such error to a minimal amount.

Obviously such servo 'control' is independent of which of the valve piston or valve cylinder is attached to the rod and which attached to the table, since the supply and machine tool connections will be made to achieve connection in the desired sense.

It will be noted, that the invention would equally apply to an electrical servo control wherein the rod 22 was attached (say) to one of a potentiometric resistance or sliding contact thereon, whereas the table 28 was attached to the other of the potentiometer or sliding contact and wherein movement of the rod element 22 relative to the table element 28 from a null position produces electrical flow, connected to cause movement of the table in a direction tending to reduce the flow of current until the null position is again reached.

Figure 3A:
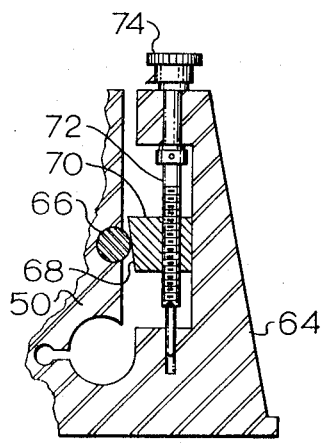
FIGS. 3a and 3b show details of the device.
Figure 3B:
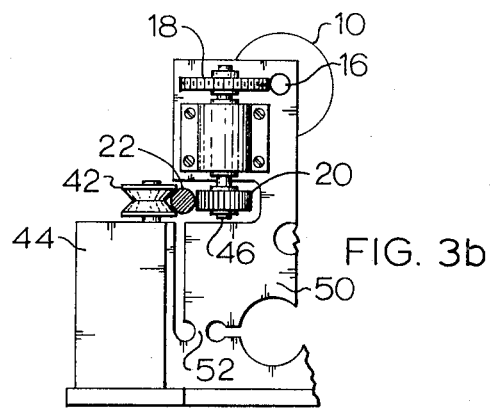

The preferred form of the calibration control is shown in FIGS. 3 and 3a. (Reference may also be made to FIG. 4.) As shown in these drawings, rod 22 is held between an idler support wheel 42 and the teeth 24 of gear wheel 20. Idler wheel 42 is rotatably mounted on a base support for the mechanism, generally indicated at 44. Gear wheel 24 is mounted on shaft 46; shaft 46, in turn, being rotatably mounted on support 48. Support 48 along with other parts is mounted on block 50. Block 50, although preferably made from the same material as block 44 (preferably cold drawn steel) is defined by cuts and slots in such a way as to be connected to block 44 by a narrowed portion 52 which allows limited movement of the member 50 relative to the base 44. Such limited movement, using the inherent yieldability and resiliency of the material of block 52, is sufficient to provide (where the teeth are cut on the servo mechanism itself) for the very small amounts of movement required to achieve, during calibration the desired range of incursions of teeth 24 into rod 22 (in the preferred embodiment, up to a maximum incursion of 0.002 thousandths of an inch). Thus the rack indentations and the tooth incursions into the rack, shown in the drawings are greatly exaggerated for the purposes of illustration. Whether the indentations are cut away from the machine or on it the movement of member 50 is used to adjust wheel 24 to the correct position and with either method for producing the rack, the movement of member 50 is used to couple teeth 24 and release teeth 24 from the rod.

Mounted on the opposite end of shaft 46 from wheel 24, for rotation therewith, is worm wheel 18. A pulse motor 10 and its shaft composed of members 12, 17 and 14 are each (the latter rotatably) mounted on the deflectable member 50. On the end of shaft 14 remote from motor 10 is a worm 16 located to mesh with worm wheel 18. (It will be appreciated that the members mounted on deflectable member 50 may, within the scope of the invention, be otherwise deflectably mounted relative to the base 44, than by the narrowed portion 52, such as, for example, by a spring loaded pivotal connection). Pulses are supplied to the motor and power is supplied to the motor along leads only generally indicated at 62. The motor 10 responds to the pulses, as well known to those skilled in the art, by stepping shaft members 12, 17 and 14 through an equal angular increment in response to each pulse received by the motor 10. Conventional pulse motor design allows pulses to rotate the pulse motor 10 in either selected direction.

The mechanism, so far described, is controlled, preferably by wedging an abutment 64 forming a rigid part of base 44 and the deflectable member 50. In the preferred embodiment the deflection is achieved between a cylinder 66 mounted to have a convexity projecting from block 50, and a wedging surface 68. The wedging surface 68 is part of block 70. Block 70 is slidably reinforced by a surface of member 64 on the side remote from cylinder 66 and is threaded on shank 72 rotatably mounted at each end in member 64 for rotation by a control knob 74. The shaft 72 is mounted to be restrained against axial movement, hence the rotation of shaft 72 by knob 74 achieves movement of block 70 and wedging surface 68 up or down the shaft 72, depending on the direction of rotation on the shaft. The location of the cylinder 66 and surface 68 are arranged so that within the desired range of movement of wheel 20, the cylinder 66 is deflectably bearing on the surface 68. The knob 74 may be provided with a dial to indicate the depth of incursion of the teeth 24 into rod 22. It is not important whether or not the cylinder 66 rotates relative to the member 50. The cylinder 66 is provided so that, in the event of wear, it may be replaced by another cylinder without replacing the entire member 50.

When the rack rod 22 is cut on the servo mechanism itself the operation is similar to that for cutting the rack on the rod off the mechanism. The operation is performed by rotating the rod 22 to an unmarked orientation relative to teeth 24, at a time when the block 70 is moved upwardly sufficiently far that teeth 24 are out of contact with the rod. This will usually be an orientation having a predetermined index position indicated by knob 49 (similar and similarly mounted to knob 149) (FIG. 1) relative to a pointer 53 mounted to be fixed to the base for the servo drive mechanism and similar to pointer 153 (FIGS. 1 and 2). As previously stated the block is then lowered by rotation of the shaft 72 through knob 74, in the proper direction, until the teeth 24 are embedded in rod 22 a predetermined amount approaching the required depth. The motor 10 is then rotated by providing a predetermined number of pulses thereto and the resultant movement or the rod 22 (or connected table 28) measured. If the incursion of the teeth in the rod is too shallow, or too deep, then the travel of the rod will be greater or less (respectively) than desired. As previously explained, this is corrected by rotating the rod 22 to a new location with a new setting for the teeth depth, until the correct calibration is achieved. The machine tool may then be controlled by pulses to the motor 10 causing movement of the table 28 as previously described. In accord with the well known design of such motors, the pulses may be applied to move the motor in one sense, or the other, creating corresponding movement in the table 28. When a new calibration of the rod is required, requiring shallower incursion of the teeth 24 into rod 22 than that when existing, then the teeth 24 are retracted by retracting wedge 70 and the rod 22 is turned to expose an unmarked extent to the teeth 24.

Where the rod is made off the machine then when the rod 22 is installed on the machine the wheel 20 is adjusted so that its teeth ride in the spaced indentations in a similar manner to that described in connection with the cutting of the teeth on the machine. However the wheel 22 is not lowered enough to further cut the rod. It is found that, the indentations once cut provide a substantially constant linear travel for a given travel of the wheel regardless of whether the teeth at a later time are caused to embed themselves to the same full depth as the cutting teeth. Accordingly the wheel 24 is merely lowered close to full depth in the indentations for use of the device. When a wheel 24 is engaged with a pre-cut rack, a tooth of the wheel must be approximately centred in an indentation, otherwise the harder wheel will cut unwanted indentations in a softer metal rod. Although the indentations are so small as to be almost invisible, a skilled machinist may accomplish this by eye and touch. In many applications however it may be found more suitable to provide optical means (not shown) for indicating, on the wheel 20 that a tooth 24 is on the nearer radius perpendicular to the rod, and for indicating on the rod that an indentation is approximately centred on the perpendicular.

A pre-cut rod including diametrically opposed racks to provide inch or metric output is provided with an indexing knob 49 fixed by a setscrew to the flat thereof, exactly as in the pre-cutting step first described. The base of the servo drive is designed to provide a pointer 53 which may be aligned with the knob to set the rod to the desired orientation (with wheel 20 out withdrawn to allow free rod movement.)

Typical dimensions are now described for a rod designed to provide alternatively racks with an inch or a metric output. These are an example only of what has been done. Other alternatives are available and are within the scope of the invention.

In the form in which the incl., metric rod was actually performed as follows. The inch rack was cut by a wheel of 0.5093 foot with 100 peripherally disposed teeth of saw tooth form having a 90° included angle. The pulse motor to be used was designed to require 8,000 pulses (angular increments) per revolution. With a gear box of appropriate ratio the wheel, cutting the rod at an empirically determined depth would drive the rod 0.0002 inch ($2 \times 10^{-4}$) inches or 1.6000 inch per revolution.

The metric rack was cut with a 100 tooth 90° included angle wheel as before but having a 0.5012 foot diameter (for use with the same pulse motor and gear train) and the correct depth determined empirically to provide 0.005 ($5 \times 10^{-3}$) mm rod movement per motor pulse.

Since 40 mm equals 1.5748 inch (approximately) the difference in rod traved per revolution of a wheel meshing therewith would be 0.0252 inch or 0.000252 inch per tooth. The wheel with which the rod was used on the servo mechanism was selected approximately intermediate the two cutting wheels, having a diameter of 0.5053 foot. It was found that this wheel, on the servo mechanism would accurately drive either the inch or the metric rods and the calibrated rods adjacent. The interference because the wheel was different from the cutting wheels of −.000126 inch on the inch rack and +.000126 on the metric rack was found not to affect the results.

By varying the depth of the respective cutting gear it was further possible to provide racks on each side of each of the inch and metric racks to provide for slightly increasing (on one side) and decreasing (on the other side) rod travel so that final calibrations of rod travel may be performed on site.

The softer rod cut by the harder teeth may be hardened after being cut.

A read-out of rod travel in metric or inch unit may be obtained from a shaft attached to the worm wheel or a shaft attached to the worm; or both.

I claim:

1. In combination, a servo drive comprising a gear wheel designed to be driven, and a substantially metal rod longitudinally extending in a predetermined direction, provided with a series of indentations extending in and substantially regularly spaced in said direction, said rod being so mounted that said indentations are engaged by said teeth, whereby said gear wheel will drive said rod in said direction over a predetermined range of movement and wherein the spacing of said indentations is such that the teeth of said gear wheel will serially engage said indentations when said rod is driven thereby over said range of movement, wherein said indentations were formed by moving said rod longitudinally in contact with a rotating toothed wheel of harder metal, arranged relative thereto so that said teeth embed themselves in said rod during such movement and create the indentations therein.

2. In combination, as claimed in claim 1 wherein two series of indentations are provided in said rod at spaced orientations about said longitudinal axis and wherein said rod is mounted to rotate about said axis to selectively bring either of said series of indentations into such engagement with said toothed wheel, and wherein each of said indentation spacings is different but each is sufficiently similar to the spacing of said toothed wheel that said indentations will remain in engagement with said toothed wheel over said range of movement.

3. Method of converting a substantially metal rod for operation as a gear rack, comprising the steps of, causing said rod to be moved longitudinally during the rotation of a toothed wheel of greater hardness than said rack, while said rod is positioned in relation to said toothed wheel to cause said teeth to embed themselves in said rod to a predetermined depth while rotating in contact with the longitudinally moving rod.

4. A longitudinally extending substantially metal rod for use in a servo mechanism where the position of the rod in the longitudinal extension direction conveys a control signal, wherein said rod is provided with indentations spaced and extending in said longitudinal direction, said indentations formed by a toothed wheel simultaneously rotating and forming indentations in said rod, while said rod moves longitudinally therepast with one of said rod or wheel driving the other.

5. Method of converting a substantially metal rod for operation as a gear rack comprising the steps of: positioning said rod so that a toothed wheel of greater hardness than said rod, will simultaneously embed its teeth to a predetermined depth in said rod while rotating with one of said rod or wheel driving the other.

* * * * *